Oct. 4, 1966 K. PRESTON, JR 3,277,286

LOGIC DEVICE FOR SIMPLIFYING PICTORIAL DATA

Filed April 12, 1963 3 Sheets-Sheet 1

INVENTOR.
Kendall Preston, Jr.
BY
Daniel R. Levinson
ATTORNEY.

INVENTOR.
Kendall Preston, Jr.
BY
Daniel R. Levinson
ATTORNEY.

LOGIC DEVICE FOR SIMPLIFYING PICTORIAL DATA

Filed April 12, 1963 3 Sheets-Sheet 3

INVENTOR.
Kendall Preston, Jr.
BY Daniel B. Levinson
ATTORNEY.

United States Patent Office 3,277,286

Patented Oct. 4, 1966

3,277,286

LOGIC DEVICE FOR SIMPLIFYING PICTORIAL DATA

Kendall Preston, Jr., New Haven, Conn., assignor to The Perkin-Elmer Corporation, Norwalk, Conn., a corporation of New York Filed Apr. 12, 1963, Ser. No. 272,729
15 Claims. (Cl. 235—92)

This invention relates to a device for performing a logical operation on pictorial data. More particularly, the invention utilizes an array of electroluminescent photo-conductive cell units to progressively operate upon an optical field so as to extract data concerning the number and size of discrete illuminated areas or particles contained therein.

The specific embodiment of the invention illustrates the use of such an array of such units for reducing in size or "shrinking" the individual images present in the field initially presented to the array. This particular combination is useful as a step in the process of automatically counting and sizing particles, since the information sought (the number and size of particle images in the field of view) is preserved while the data is reduced to its simplest form. Thus, the specific apparatus hereinafter more fully disclosed is capable of reducing the size of each of the particle images in the field of view so as to expedite their counting and sizing and the handling and storage of the resulting numerical data.

The invention utilizes electroluminescent elements, each of which is in close proximity to a plurality of photoconductive cells and each of which is energized by an electric circuit including in series therewith a single one of the photoconductive cells. Such an array of electroluminescent elements and both physically and electrically associated photo-conductive cells may perform the abovementioned shrinkage operation by a comparatively simple connection of the various leads supplying actuating voltage to various groups of the electroluminescent elements. By providing suitable means for switching the external voltage source applied to these elements, the composite array will progressively shrink patterns representative of individual images originally presented thereto. An example of the use of this shrinkage technique in simplifying the counting of discreet particle images may be found in United States patent application Number 211,935, filed July 6, 1962, now Patent No. 3,214,574 which is a continuation of application S.N. 845,254, filed October 8, 1959, and now abandoned, assigned to the assignee of the instant application.

For the purpose of making the operation of the invention more readily understandable, a simple one-dimensional array of composite electroluminescent and photoconductive cell units is first disclosed; but the subsequentially illustrated and described two-dimensional array may be considered the preferred embodiment, although the first linear array may actually be used for shrinking line images. It is, of course, possible to extend the invention to even three-dimensional fields, since this requires only an extension of the principles herein taught.

An object of the invention is the provision of a device for eliminating the redundant detail from individual discrete images in a field so as to facilitate the counting and sizing thereof and the subsequent handling and storing of the data representing the number of such discrete images according to size originally present in the original viewed field.

Another object of the invention is the provision of a device which will progressively shrink the size of discrete images in the field presented thereto as to facilitate the counting and sizing of such images as well as the subsequent data handling and storage.

A further object of the invention is a provision of a device which counts according to size the number of discrete images in a given field, which utilizes a relatively small amount of power and is relatively compact in physical dimensions.

Further objects and advantages will be obvious to one skilled in the art, upon reading the following specification in conjunction with the accompanying drawings in which.

Figure 3:
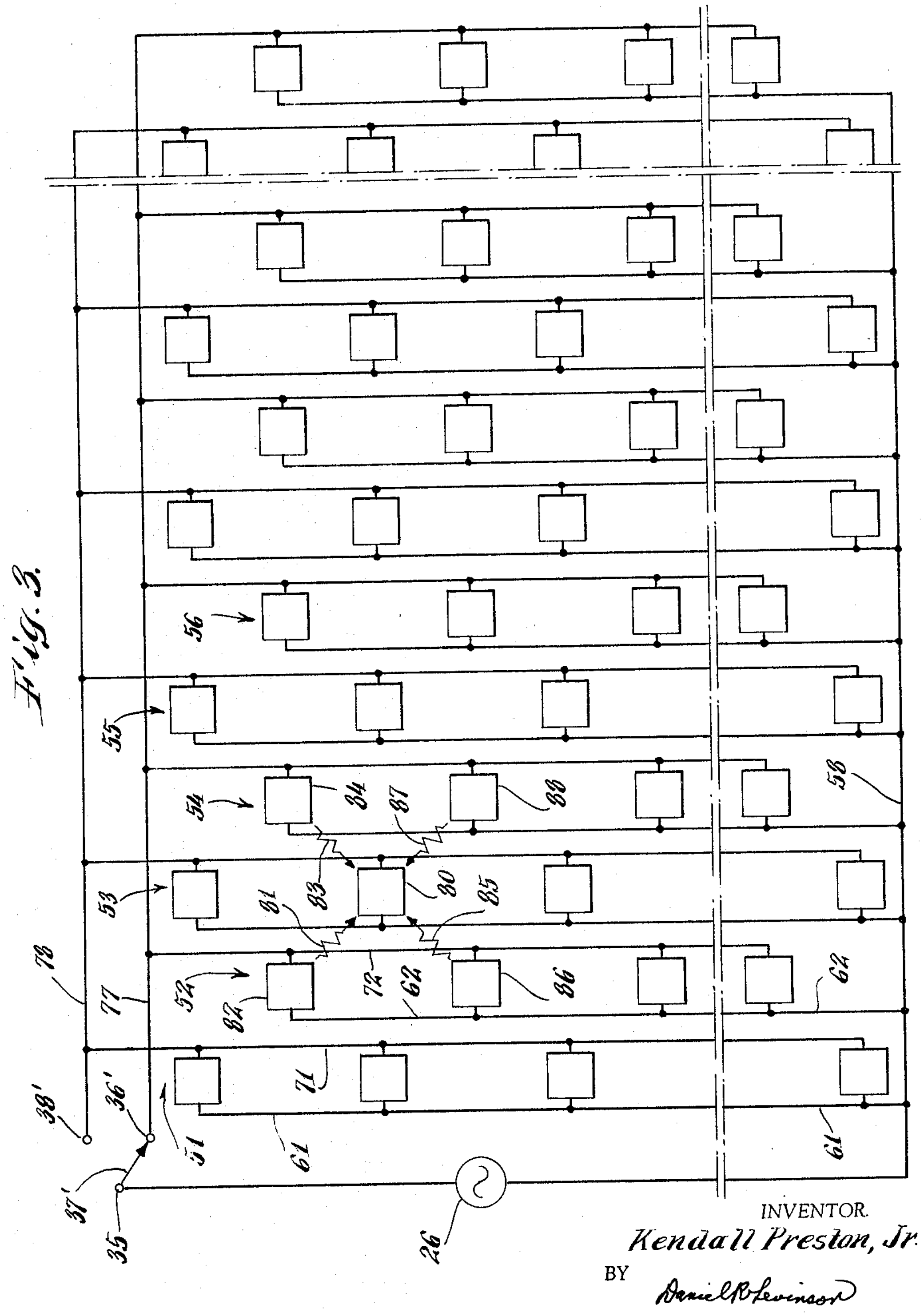
FIGURE 3 is a schematic representation of a plan view of a two-dimensional array of composite units of the type shown in FIGURE 1.
Figure 5:
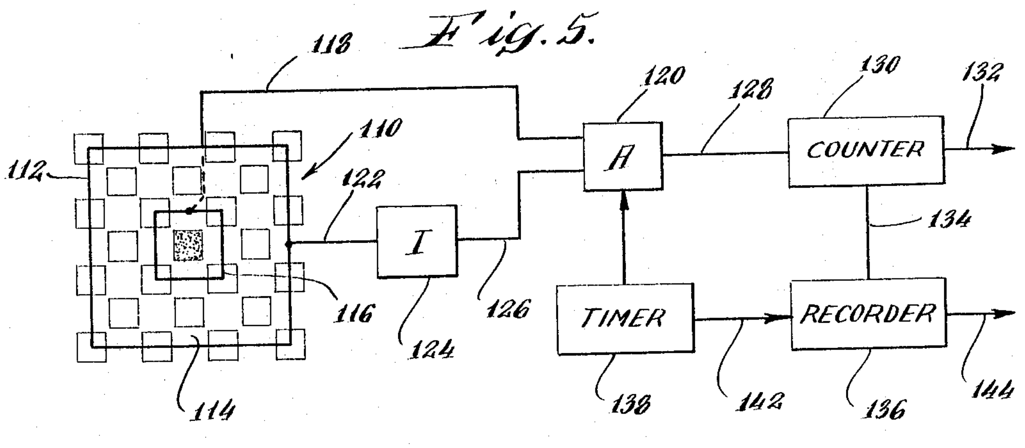
Figures 5A, 6:
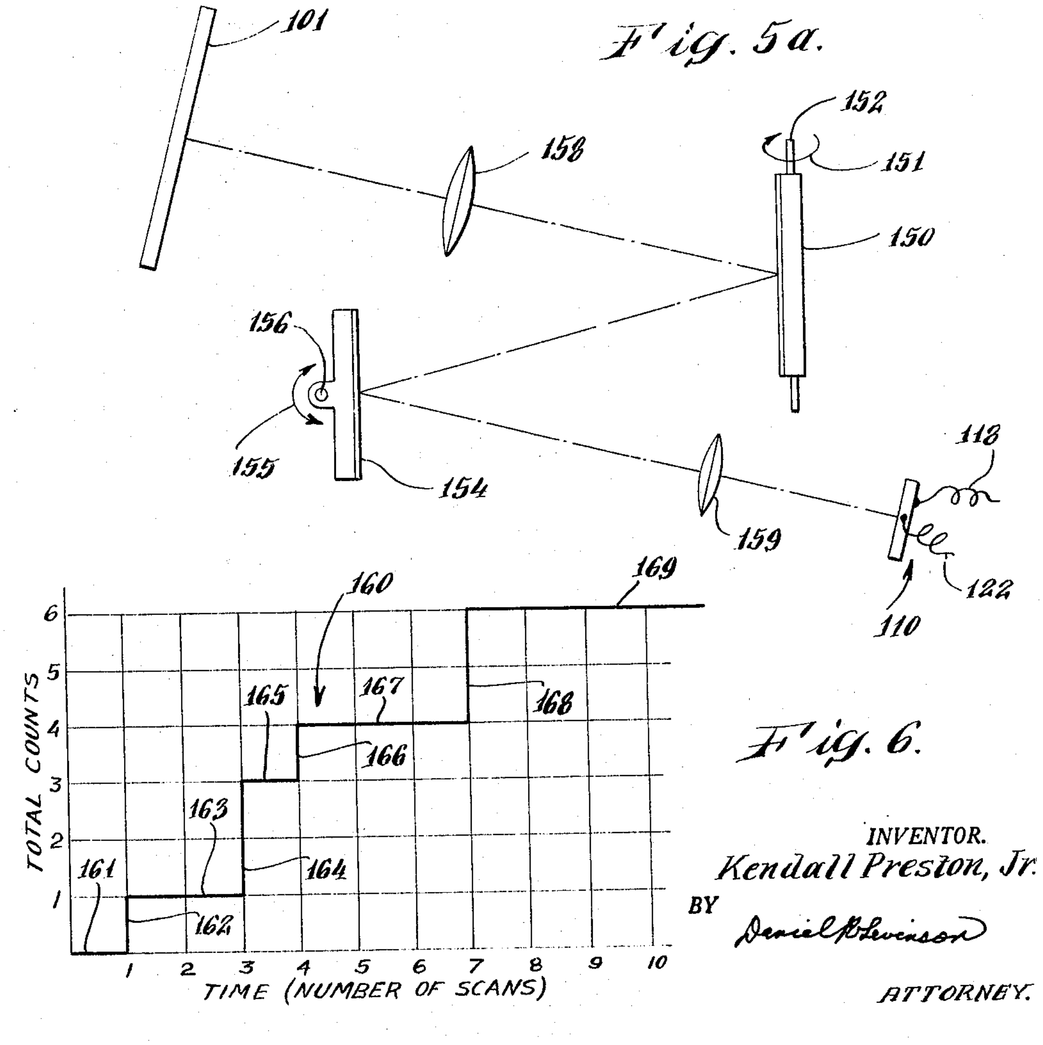

FIGURES *4a*, *4b*, and *4c* is a plan schematic showing progressive steps in the simplifying or shrinkage process performed by the apparatus of FIGURE 3;

FIGURE 5 is a plan schematic of a detector means for counting completely shrunk individual images, as shown in FIGURE *4c*, and determining their original size;

FIGURE *5a* is a diagrammatic side elevation of one scanning means for causing the various parts of the composite unit array to be moved across the detector of FIGURE 5; and FIGURE 6 is a diagrammatic representation in graphical form of the number and size data obtained from the combined devices of FIGURES 3 and 5.

Figure 1:
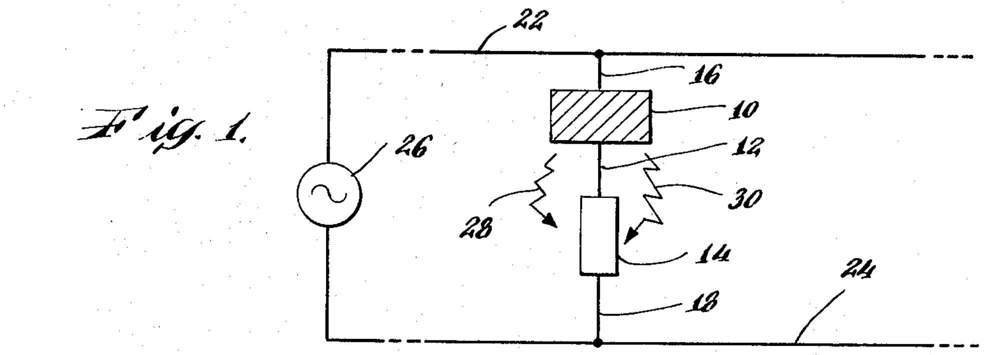
FIGURE 1 is a schematic representation of a single electroluminescent element and its electrically associated photo-conductive cell, showing the electric leads and voltage source therefor.

In FIGURE 1 the basic or composite unit utilized in the invention is shown as composed of an electroluminescent element 10, connected by lead 12 to a photo-conductive cell 14. The opposite ends of the electroluminescent element and photo-conductive cell are connected by leads 16 and 18, respectively, to main leads 22 and 24. A source of A.C. voltage 26 is connected across main leads 22 and 24 at some convenient position. A single composite unit of the type shown in FIGURE 1 has the property of being non-conductive even though the external voltage source 26 is on, until such time as photo-conductive cell is first activated by photons from some external radiation falling thereon. In other words, the resistance of photo-conductive cells 14 (in the absence of incident radiation) is sufficiently high and the voltage of source 26 is sufficiently low that the voltage across electroluminescent element 10 is insufficient to cause activation thereof. Therefore, when no external radiation has impinged on the device, electroluminescent element 10 will be in its non-luminous state.

Whenever any external illumination (of an appreciable magnitude) falls upon photo-conductive cell 14 (say, coming from the bottom of FIG. 1), its resistance will drop so that a large portion of the voltage of source 26 will be applied directly across electroluminescent element 10. By choosing a source voltage of sufficient magnitude for the particular physical and electrical properties of electroluminescent element 10, this large portion of the source voltage will cause the element 10 to luminesce. Once the electroluminescent element is so activated, many of the photons emitted thereby will fall upon the physically close photo-conductive cell 14 so as to cause the latter to maintain its low resistance. This photon emission is schematically represented by zig-zag lines 28 and 30 in FIGURE 1. Since this low resistant state of the photo-conductive cell will cause the electroluminescent element to continue to emit photons and since this photon emission in turn maintains the photo-conductive cell in its low resistant or conducting state, the composite cell will remain in its activated condition even after the original external radiation is extinguished. It can thereby be seen that the single composite cell of FIGURE 1 will act as a memory, preserving the fact that it has been impinged upon by radiation indefinitely.

Figure 2:
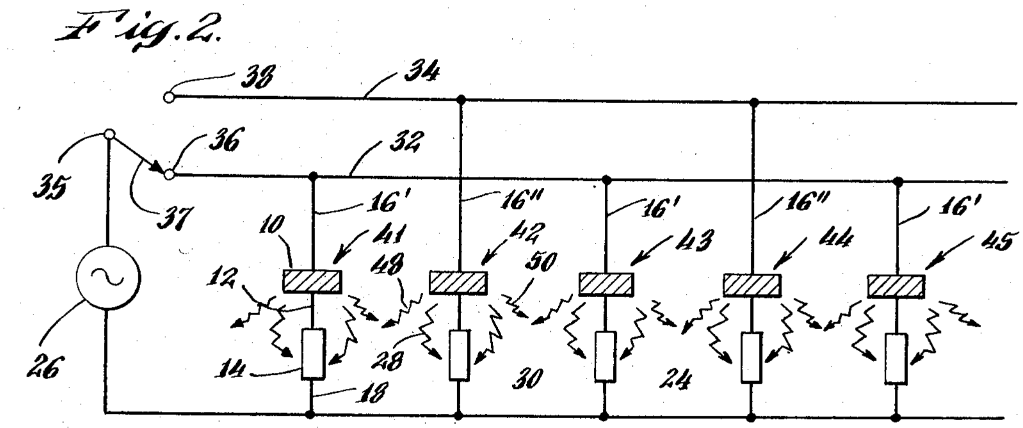
FIGURE 2 is a schematic representation of a segment of a liner array of composite units of the type shown in FIGURE 1, and the associated leads and switching arrangement for causing the "shrinking" of a linear image which has been presented thereto.

In FIGURE 2 a linear array of composite units of the type composed of elements 10–18 in FIGURE 1 illustrates how the invention utilizes an array of such composite units to shrink an initially illuminated area of an image field falling thereon. Since the electroluminescent element and the photo-conductive cell of each of these composite units is identical to that of FIGURE 1, only the left-hand composite unit has these portions referenced. Similarly, the leads 12 and 18 are identical in each of the composite unit circuits and are therefore labelled only in the first composite unit. On the other hand, the lead from the upper surface of the electroluminescent element 10 is variously connected to two different main leads 32 and 34. Thus, the first, third and fifth composite units are connected by short leads 16' to main lead 32, while the second and fourth electroluminescent elements are connected by a longer lead 16'' to main lead 34. It should be noted that the linear array shown in FIGURE 2 may be continued to any extent desired with each of the adjacent pairs of units being alternately connected to main lead 32 and main lead 34, respectively. Voltage source 26, in FIGURE 2, is connected to one terminal 35 of a two-position switch 37, which may be made to contact either terminal 36 of main lead 32 (as shown) or terminal 38 of main lead 34.

In addition to the electrical connections illustrated in FIGURE 2, the individual composite units are intentionally positioned sufficiently close to each other that photons from an electroluminescent element will fall not only upon the electrically associated photo-conductive cell but also on the two photo-conductive cells of the pair of composite units on each side thereof. For example, the photons from the electroluminescent element of the second composite unit will not only fall upon the electrically associated photo-conductive cell as schematically represented by zig-zag lines 28 and 30, but will also fall upon the photo-conductive cell 14 to the left (see zig-zag line 48) and the photo-conductive cell to the right (see zig-zag line 50).

For convenience in referring to the different composite units, they have been generally referenced 41, 42, 43, 44 and 45 despite the fact that the composite cells themselves are actually identical. As may be seen in FIGURE 2, units 41, 43, and 45 will have the voltage of source 26 impinged thereacross when the switch 37 is in contact with terminal 36. If at this time the photo-conductive cells are all illuminated by a continuous linear image, only the odd-numbered composite units will become actuated, since cells 42 and 44 have no applied voltage. These odd-numbered units will continue to carry current even though the original energizing radiation of the image is no longer present. Thus, if the image is obscured by a shutter or any other mechanism the units 41, 43 and 45 will continue to be self-actuated in a manner already explained in conjunction with FIGURE 1. Composite units 42 and 44 will, of course, remain off. If switch arm 37 is now rapidly moved about pivot terminal 35, so as to contact terminal 38, the source voltage will be impressed across these two even-numbered composite units. Since the adjacent electroluminescent elements of composite units 41, 43, and 45 are still emitting photons at the time switch arm is moved, the photo-conductive cells of the composite units 42 and 44 will be in their low resistant or "ready" state, so that a large portion of the voltage will be applied directly across the electroluminescent elements of the composite units 42 and 44. This is caused by the fact that each of units 42 and 44 are surrounded by two emitting electroluminescent elements and the combined illumination therefrom is sufficient to cause this effect, as more fully explained hereinafter. For this reason, these elements will start to luminesce and therefore maintain these latter two units (42 and 44) in this "on" position. At the same time, the movement of switch arm 37 will cause the odd-numbered composite units to be deactivated or turned off, since there is no voltage across them. Movement of the switch arm back to its original position so as to apply the voltage once again to the odd numbered composite units will cause only unit 43 to be reactivated. Since the switch shown is only exemplary of any means for alternately connecting the voltage to the two series of units, any reasonably rapid means for alternately connecting the voltage source to these two groups may be used. The necessary switching speed is determined by the time of decay of the luminescence of the electroluminescent elements after the voltage is removed and the time of return of the photo-conductive cells to their off (or high resistance) state when the photon emission thereon ceases.

The reason that neither unit 41 nor unit 45 will be reactivated is that the spacing of the composite units, the brillance of the electroluminescent elements thereof, the actuating voltage of these units, and the sensitivity and resistance of the photo-conductive cells are so chosen that only photo-conductive cells (such as the one of unit 43) which receives illumination from two adjacent electroluminescent elements will reach a resistance value sufficiently low to actuate the electroluminescent element electrically connected thereto. In other words, the photons from the electroluminescent element of unit 42 falling on the photo-conductive cell 14 of unit 41 are of insufficient intensity to lower the resistant value of that photo-conductive cell sufficiently to be in its "ready" state to energize the electroluminescent element of the same unit 41 when the voltage source is connected to this unit. On the other hand, the photo-conductive cell of unit 43, which has been receiving some of the emitted photons from the electroluminescent elements of both units 42 and 44, will be sufficiently activated (i.e., the resistance will be sufficiently lowered) to be in its "ready" state, so that enough of the applied voltage will be effective across the electroluminescent element of unit 43 to cause it to radiate. As long as the switch arm remains in contact with terminal 36, the unit 43 will continue to be actuated. It may be noted that moving the swtich arm once again into contact with terminal 38 would not cause any of the other units to be reactuated. This is true because the photo-conductive cells of adjacent units 42 and 44 will not receive sufficient radiation from the single electroluminescent element of unit 43 to be at a fully conducting or "ready" state.

It may be seen, therefore, that the overall operation of the device of FIGURE 2 will cause the linear extent of the recorded image to become successively shorter upon repeated movements of the switch arm 37 between terminals 36 and 38. Thus, the original image, which was assumed to extend across all five units shown in FIGURE 2 is successively reduced in length to only three units and then a single unit. More generally, assuming a longer series of units, a five unit long linear luminous image would be reduced to a single unit in one round trip of the switch.

If one assumes that the linear array of units in FIGURE 2 is quite long, and that many different original external luminous images are impinged thereon initially, switching of the source voltage in the manner previously described will have the effect of shrinking all of these recorded images simultaneously. If each of the original images is assumed to be of similar original length, then repeating the switching operation the correct number of times to cause the shortest thereof to be reduced to a single unit will also cause all the other recorded line images to be rendered quite small. This process also will increase the number of dark or nonactuated units between each line image, thereby simplifying the task of determining how many images were originally present. In other words, if the original line images were say approximately ten units long with an average of only two or three dark units therebetween, the device of FIGURE 2 could reduce each of these images to one (or at most a few units) and at the same time, increase the effective spacing thereof to approximately ten units. Therefore, any subsequent means of counting the number of original images (for example, by rapid photo-electric scanning) is simplified, since the counting mechanism will now have no difficulty in determining the existence of two images which were originally closely adjacent. Normally, the photo-electric scanning will be done after each switching operation, and all linear luminous images which are about to disappear (and only such images) are counted before their disappearances. This is accomplished in a manner which will be obvious after the description of the corresponding scanning and counting means for the two-dimensional device of FIGURE 3.

FIGURE 3 schematically shows a plan view of a two-dimensional array of composite units of the type shown in FIGURE 1. It may also be considered as a slightly modified series of linear arrays of the type shown in FIGURE 2. Thus, the device of FIGURE 3 is made up of columns of linear arrays of the composite units, each of the odd-numbered columns being identical to each other, and each of the even-numbered columns also being the same. Thus, the first column (generally referenced 51) comprises a linear array of composite units in which all of the ends of the photo-conductive cells remote from the electroluminescent elements are connected together by lead 61, the lower end of which is connected to a main lower lead 58, which in turn is connected to one side of voltage source 26. The external ends of all of the electroluminescent elements of the composite units of this column are connected to each other by a lead 71, the upper end of which is connected to main lead 78, which is connected to terminal 38' at its left-hand end. It is, of course, understood that the internal connections of each of the composite units of FIGURE 3 are the same as those shown in each of FIGURES 1 and 2.

The second column 52 has all of the lower or external ends of the photo-conductive cells connected to the same lead 62, the lower end of which is connected to lower main lead 58. All of the external or upper ends of the electroluminescent elements of the units in this column are connected by lead 72 to a main upper lead 77, which joins with terminal 36' at its left. Each of the odd-numbered columns 53, 55, etc. are electrically connected in the same manner as column 51 to upper main lead 78 and lower main 58. Each of the even-numbered columns 54, 56, etc., are connected in a manner similar to the units in columns 52 to the other upper main lead 77 and to lower main 58. Because of these two different upper connections, positioning of switch arm 37' in the position shown will connect the voltage source 26 only across the units in the even-numbered columns (52, 54, etc.). For this reason, external radiation falling on the two-dimensional array of FIGURE 3 will activate only the units in the even-numbered columns when the switch arm is in the position shown. If the switch arm were instead in contact with terminal 38', then, of course, only the units in the odd numbered columns would be so energized.

In addition to the somewhat different electrical connections of the various units to the terminals in FIGURE 3, the FIGURE 3 array utilizes somewhat different physical spacing between the various composite units. Thus, a unit such as the one (in the third column and third row) labelled 80 is somewhat more distant from the diagonally adjacent units (in the second and fourth columns and second and fourth rows) than was the case for the alternate linear units in FIGURE 2. Because of this spacing (and the other parameters discussed above concerning FIGURE 2) each of the photo-conductive cells will become sufficiently conductive (i.e., its resistance lowered sufficiently) so as to be in its "ready" state and cause the electrically associated electroluminescent element to radiate, only when all four of the diagonally adjacent electroluminescent elements are in their activated state when the switch is moved. For this reason, a unit such as 80 will be actuated when the switch arm 37 is thrown from 36' to 38' only when each of the electroluminescent elements of the four surrounding units (82, 84, 86, and 88) are in the energized or "on" condition, as schematically represented by zig-zag arrowed lines 81, 83, 85 and 87.

Since the intensity of radiation from a source falls off in proportion to the inverse square of the distance therefrom, it is readily shown that the intensity from two sources each a distance of $\sqrt{2d}$ from a photo-conductive cell will have the same effect as a single radiation source (of the same intensity) a distance $d$ from the cell. Thus, the distance in FIGURE 2 of the electroluminescent elements in adjacent units (i.e., those of units 41 and 43 in relation to the photoconductive cell of 42) should be $\sqrt{2}$ times the distance ($d$) between the electroluminescent element and photo-conductive cell in the same unit. Simple trigonometry then shows that the distance between electroluminescent elements in adjacent units are then at the same distance $d$ from each other in the linear array of FIGURE 2.

For the two-dimensional set-up of FIGURE 3, where it is desired that the four electroluminescent elements of the four diagonally adjacent units produce the same effect on the centrally located photo-conductive cell as does the one electroluminescent element of the central unit itself, it is obvious that the distance of each of these electroluminescent elements to the central photo-conductive cell should be $2d$ (2 being the square root of 4) where $d$ is the distance between an electroluminescent element and photo-conductive cell in the same unit. In order to attain this relationship, the distance between the central electroluminescent element and the electroluminescent elements of each of the diagonally adjacent units must be $\sqrt{3d}$. It then follows from a further simple trigonometric calculation that the distance between the electroluminescent elements in any vertical column (or any horizontal row) will be $\sqrt{6d}$. The rule for setting up the symmetrical two-dimensional array of FIGURE 3 is therefore simply spacing the centers of the electroluminescent elements of each column this $\sqrt{6d}$ distance apart with the alternate columns vertically displaced relatively to each other by a distance $\sqrt{6d/2}$. The center lines of the columns will also be this $\sqrt{6d/2}$ distance apart, while the centers of the electroluminescent elements in any horizontal row will be separated by $\sqrt{6d}$.

Figure 4A:
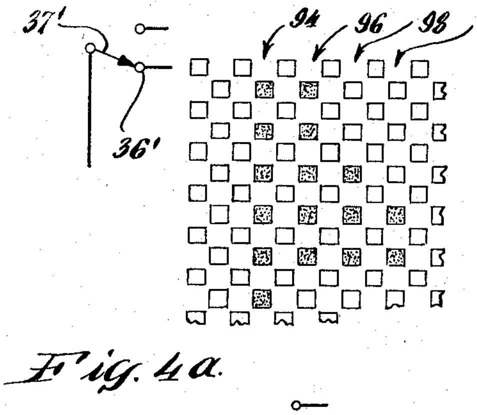
Figure 4B:
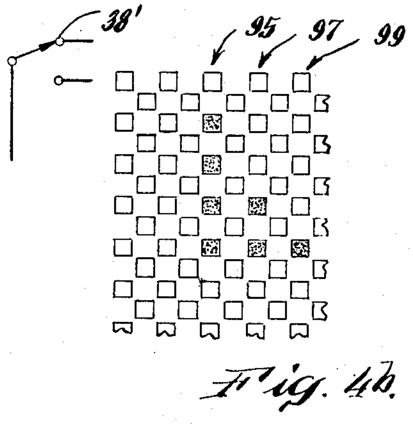
Figure 4C:
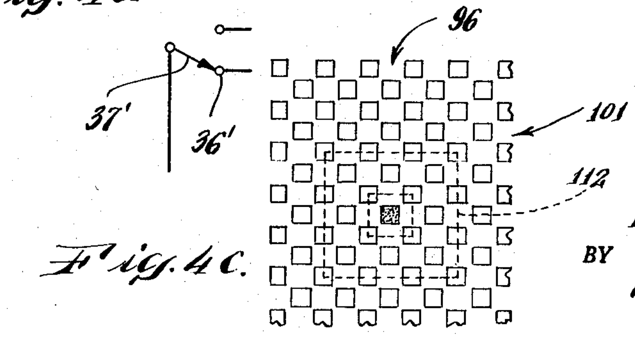

FIGURES 4*a*, 4*b* and 4*c* illustrate the progressive shrinking of an image by the device of FIGURE 3 when switch arm 37' is alternately moved from terminal 36' to terminal 38' and back again. In FIGURE 4*a*, the original image is assumed to have fallen on those units in even-numbered columns 94, 96, 98, and 100 which are shown shaded to represent their being actuated. FIGURE 4*b* shows the units in the odd-numbered columns 95, 97, and 99 which will be actuated when the switch is moved to contact 38' (assuming that the original external image or radiation source is no longer present). Thus, the units in FIGURE 4*b* which are "on" (as represented by the shaded squares) are units in the odd-numbered columns 95, 97, and 99 which were completely surrounded by four radiating electroluminescent elements before movement of the switch (see FIGURE 4*a*). Movement of the switch arm back to terminal 36' will cause the actuation of those units in even-numbered columns which have previously been surrounded by four diagonally adjacent radiating electroluminescent elements. As may be seen from FIGURE 4*b*, there is only one such unit in even-numbered column 96, and therefore only this single unit is shown as "on" in the FIGURE 4*c*.

The example of operation shown in FIGURES 4*a*, 4*b*, 4*c* is intended only for illustrative purposes, so that only a single image is shown as being reduced or shrunk by the FIGURE 3 device. In actuality, since the device of FIGURE 3 would contain many more columns and rows than illustrated in either FIGURE 3 or FIGURES 4*a*–4*c*, the shrinking process would normally occur simultaneously on as many images as were originally present on the entire array. Although the illustrated embodiment is a rectilinear array of composite units, in which a photo-conductive cell will be caused to be in its low resistant or "ready" state only when it is completely surrounded by four illuminated units, other arrangements are possible. For example, the spacing of the units may be less so as to cause any photo-conductive cell which is in the center of only three (or even two) illuminated adjacent electroluminescent elements to be in its "ready" state. This will cause the shrinking to take place somewhat more slowly, but otherwise will function in a similar manner. Further, other repetitive patterns of units not including straight line columns and rows may be used. Obviously, it will be much easier to count these reduced images than was the case for the large and perhaps almost touching original images, regardless of the specific manner in which the images are "shrunk."

One specific type of apparatus in which the inventive device is particularly useful is a particle counting and sizing apparatus. In such use the device of the invention is particularly desirable where a large number of particles, comparatively closely spaced, are desired to be counted according to original size groupings in a relatively rapid manner. By reducing each of the particles image size before counting, the possibility of confusing two more closely adjacent particle images as a single large particle by the scanning counter or other counting mechanism is essentially eliminated. In addition, the entire scanning, counting and sizing, and data handling parts of the apparatus may be both simplified and made to less exacting specifications, since not only are the reduced images more easily distinguished but the final output may be directly recorded without any counting and sizing.

A schematic illustration of one type of counting device which may be utilized with the array 101 of composite units patrially shown in FIGURES 3, 4*a*, 4*b* and 4*c* is represented by FIGURE 5. In this figure a portion of the FIGURE 4*c* array is shown as being projected onto detector 110. More specifically, this portion includes those composite units forming a square, the sides of which passes through those composite units in FIGURE 4*c* shown by the dotted line 112. As best seen in FIGURE 5, the detector 110 comprises an outer annular detector element 114 and an inner central detector element 116. The relative size of these two detector arrays is so chosen that an image of the composite units shown in FIGURE 4*c* within or on the dotted lines 112 will fall upon the composite detector in the manner illustrated in FIGURE 5. Thus, the single actuated composite unit will fall solely on detector section 116. The four surrounding composite units (which are in columns not connected to the voltage source) will be projected partially on central detector section 116 and partially on the annular detector section 114. The eight composite units surrounding these four will fall totally upon the annular detector section 114, and the twelve units surrounding these will fall partially on annular detector section 114 and partially outside the detector area.

Each of the two detector sections will produce a signal when any composite unit projected thereon is in its actuated or illuminated condition, but will, of course, produce no signal if none of the units projected thereon is illuminated. Any signal produced by detector 116 is fed by lead 118 to an AND gate 120. Any signal produced by annular detector section 114 is fed by lead 122 to inverter 124. As is well known in the logic circuit art, such an inverter will have a positive output whenever there is no signal applied to its input, and will have no output whenever a signal is applied to its input. The output of inverter is fed by lead 126 to the second input of AND gate 120. The output of this AND gate is fed by lead 128 to binary or other counter 130. This counter may have a direct read-out as schematically illustrated by arrow 132 so as to be capable of being read whenever desired. In addition, the counter will have an output at 134 connected to recorder 136. A timer 138 will be connected so as to actuate both AND gate 120 (by connection 140) and the recorder 136 (by connection 142). The output of the recorder is schematically illustrated by arrow 144.

To illustrate the function of this counting circuit, we will first assume that only the central composite unit (i.e. the one projected solely on detector section 116) is in its illuminated condition, and all of the other composite units within (or partially within) the detector periphery 112 are off. Under these conditions, detector section 116 will supply a signal to the first input of AND gate 120, and annular detector 114 will supply no signal to inverter 124. Since the inverter has no signal at its input, it will produce a signal at its output so as to also supply a postive signal to the second input of AND gate 120. Since the AND gate has both of its inputs actuated, it will supply a signal to counter 130 so as to increase the count therein by a single unit.

It should be noticed that if any of the composite units projected onto annular detector section 114 are in their illuminated state, a signal would be fed to the input of invertor 124 so as to cause no signal to appear at its output. Under these conditions, the AND gate (since only one of its inputs would be actuated) would not produce a signal at its output. Similarly, if the central composite unit were not illuminated, no signal would be fed over lead 118 to the first input of the AND gate. This would likewise cause no signal to appear at the output of this gate regardless of the state of all the surrounding units. It should also be noticed that the four composite units immediately surrounding the central one are not connected to the voltage source when the central unit is, but if any of these four were illuminated, the circuit will not cause a count to be made, since this will cause both of the detector section 114 and 116 to be actuated. Therefore, the circuit will cause a count to be registered only when the central composite unit is illuminated and all of the surrounding units falling within periphery 112 are not. Therefore, this counter will count only isolated single illuminated units as the array of FIGURE 3 is scanned by the detector. This scanning may be accomplished by any conventional optical means for moving an image of the entire array across the detector 110.

One means for accomplishing this movement is schematically illustrated in FIGURE 5*a*. The second pattern may be a conventional line trace, accomplished by moving the image of the array horizontally across the detector at a relatively rapid speed by means of a moving optical element, such as a rotating or tilting mirror 150, which tilts about vertical axis 152 (as indicated by arrow 151). Upon completion of a horizontal scan across the entire width of the array, another optical element such as mirror 154 which rotates about horizontal axis 156 (as indicated by arrow 155) will move the projected image of the array twice the distance between two rows of the composite units so as to cause the next horizontal scan to be centered upon the second lower row. The reason that the scanner skips a row is that for any given position of switch arm 37′, only alternate rows (or columns) may contain illuminated units. For this reason only those alternate rows (say, the even numbered ones) need be scanned between any given movement of the switch arm (say, to terminal 36'), since these rows contain all the units in those columns (in this case, the even numbered ones) which are connected to the voltage source. After the scanning of these (say, even numbered rows) is completed, the switch arm is thrown back to the other position (i.e., to terminal 38'), and the other (odd-numbered) rows are scanned in a similar manner so that all of the units (in the odd-numbered columns) which may be illuminated for that position of the switch are sequentially centered on the central detector element. It may be noted that since the second input to the AND gate will be positive only when no part of any illuminated unit is on annular detector element 114, both AND gate inputs cannot become positive until the horizontal scanner has more or less centered the image of the illuminated unit on the central detector element 116. Since the detector is not directionally sensitive, each of the horizontal scannings may be accomplished in opposite directions (i.e., in a zig-zag pattern) as well as in the same direction. Lenses 158 and 159 may be utilized to form a sharp image of the scanned portion of array 101 onto the surface of detector 110.

Thus, by moving the image of the array across detector 110 in the above described rectilinear scanning pattern (but not necessarily by the means shown) or in any other suitable scanning pattern, the number of isolated illuminated units (such as the one shown in FIGURE 4*c*) will be counted. The timer 138 (see FIG. 5) will cause the recorder to produce a permanent record of the number of total isolated illuminated units counted by counter 130 after each completed scanning of the array. Each of these scanning completions and recordings will, of course, take place just before movements of the switch arm 37' (or other means utilized to switch the voltage source 26 across the alternate columns). An illustration of a typical recording is shown in FIGURE 6.

This recording comprises a histogram 160. More specifically, this histogram comprises a single line having horizontal portions 161, 163, 165, 167 and 169, and vertical portions 162, 164, 166, and 168. The ordinate of the graph represents the total number of isolated illuminated units counted by the circuit, while the abscissa represents the number of scanning cycles. Thus, the illustrated graph shows that for the first scan, no isolated illuminated units were encountered. During the next scan, however, a single isolated composite unit was found as shown by the vertical rise 162 of one-unit length. During the next scan, however, no additional isolated illuminated unit was found, as shown by the fact that horizontal line 162 is two units long. On the fourth scan, however, two additional counts were made (i.e., two more isolated illuminated units were encountered) as shown by the fact that vertical line 164 is two units long. Similarly, one more isolated illuminated unit was encountered on the fifth scan as shown by vertical line 166. On the sixth and seventh scannings no additional isolated units existed as shown by the fact that horizontal line 167 is three units long. On the eighth scan two new illuminated isolated units were encountered, so that vertical line 168 is two units in length. Subsequent scannings found no additional isolated iluminated units, as shown by the fact that horizontal line 169 continues indefinitely.

The histogram of FIGURE 6 yields not only the total number of isolated illuminated units scanned (and therefore the number of discrete images or particles originally on the array of FIGURE 3), but also yields information as to the size of these original particular images. Thus, the exemplary histogram of FIGURE 6 indicates that no original images were so small as to be shrunk by a single throw of switch arm 37' to an isolated illuminated unit; that one image was so small that two movements of the switch arm (i.e., one round trip) would so shrink it; that two of the original images were so shrunk by the fourth movement of the switch arm; that one was of such size as to require five movements and that two more were completely shrunk only after eight such movements. Thus, the final output of the recorder at 144 yields a permanent record of both the total number of original particles (or other objects) initially imaged onto the array of composite units and detailed information as to the size of each of these particulars. In other words, the FIGURE 6 histogram would tell the operator that there were six particles present in the original field of which one was quite small, two were of moderate size, another of somewhat slightly larger size, and the last two of which were quite extensive.

Since the specific detecting and counting arrangement of FIGURE 5 is designed to count only single, completely isolated, illuminated units, it might appear that all particle images would be counted before their disappearance. However, this is not always true. The exemplary arrangement of FIGURE 5 will not count those particles which are shrunk to two or three units, rather than a single one, before total disappearance. The previously described shrinking process involves the reduction of four illuminated units in the form of a square (see FIGURE 4*b*) to a single unit (see FIGURE 4*c*), and before that the reduction of eight illuminated units in the form of a square (see FIGURE 4*a*) to four (see FIGURE 4*b*), and so on. It therefore follows that each of the largest squares of illuminated units contained in the original particle image will be reduced to a single illuminated unit after a particular number of throws of the switch. All illuminated units outside of these largest squares will be extinguished by the time the largest squares have been reduced to a single illuminated unit. If the particle image contains only one such square (as is true in FIGURE 4*a*), the finally shrunk image will contain only a single illuminated unit (see FIGURE 4*c*). Fortunately all particles having the configuration of a circle or any regular polygon contain only one such largest included square of units, as do many irregularly shaped particles (such as the one outlined by the illuminated units in FIGURE 4*a*).

On the other hand, any irregularly shaped particle which includes more than one largest square pattern of illuminated units will not reduce to a single isolated unit. This is true whether these largest contained squares are separate or overlapping. As an example of the latter situation, if the particle were so shaped as to cause the unit in column 98 just above the three illuminated ones in FIGURE 4*a* also to be illuminated, there would be two overlapping squares of eight illuminated units each contained in FIGURE 4*a*. Upon movement of switch arm 37' this would reduce to a pattern similar to that shown in FIGURE 4*b*, but with the unit in column 97 just above the two illuminated ones also "on." Movement of the switch arm once again would cause the unit in column 96 just above the illuminated one in FIGURE 4*c* also to be "on." But two such adjacent units will not be counted by the particular detector and counter of FIGURE 5. Additionally, any particle which includes a plurality of spaced largest included squares will result in a plurality of isolated illuminated units (or groups of units) during the shrinking operation. Thus, a (for example) dumbbell shaped particle would reduce to two isolated units and therefore be counted as two separate particles. Although some of these errors may tend to cancel each other, it is preferable to utilize the relatively simple detector and counter of FIGURE 5 only for counting (according to size) those particles which are primarily of circular or regular polygonal shape. Somewhat more complicated detector and counting arrangements would be used where irregularly shaped particles predominate.

Since the example of the more complicated scanning and counting arrangement for the two-dimensional array of FIGURES 3, 4*a*, 4*b*, and 4*c* has been shown in FIGURES 5 and 5*a*, it is deemed obvious how a similar arrangement may be utilized to scan and count the linear array of FIGURE 2. For such a purpose, a detector of the same general type as shown in FIGURE 5 may be utilized, the linear array being projected on either a vertical or horizontal line across its center. The two scanning means in FIGURE 5*a* may obviously be replaced by a single rotating mirror. As in the FIGURE 5*a* two-dimensional embodiment, the particular scanning and counting means described are intended to be solely exemplary, since various different means may be substituted for either of these.

Although the exact configuration and materials utilized in the electroluminescent elements and the photoconductive cells form no part of the present invention, it is anticipated that the electroluminescent elements would actually be deposited on an electrically insulating sheet of material. By utilizing a mask having appropriate apertures, these elements may be readily deposited so as to form any particular pattern or mosaic, such as the array shown in FIGURE 3. Since it is possible to employ electroluminescent elements requiring only approximately 10 microwatts each, an array of the type shown in FIGURE 3 may include as many as three hundred columns, each of which includes three hundred units without exceeding a total power requirement of a single watt. Thus, the device of the present invention may perform the same operation as the electrical circuits utilized in the previously mentioned United States patent application, which electric circuits require approximately one hundred times as much power.

The device of the invention therefore accomplishes the basic objective of simplifying the counting according to size groupings of discreet images by reducing the size of these images in a relatively inexpensive manner. Although the device has been illustrated and described in a specific form, it is also contemplated that by utilizing groups of sub-arrays, each of which is of relatively small dimension (for example, 50 columns of 50 units each), the device may give a direct indication of the number of particle images in the entire field according to size by the number of total electroluminescent elements remaining on after various amounts of the shrinking operation (see FIGURES 4*a* through 4*c*) have been performed on all of these sub-arrays. Thus, it is possible to measure the number of particles in various size groupings by determining how many sub-arrays carry current after each change of position of the switch or by measuring the amount of current flowing in each of these sub-arrays, as well as by using scanning techniques similar to those previously described. Therefore, the invention is not limited to any specific form of final counting or recording means, nor is it limited to the utilization of the specific electrical wiring illustrated in FIGURE 3. On the contrary, the invention may be modified or adapted to many specific uses and is therefore intended to be limited solely by the scope of the appended claims.

I claim:

1. A device for modifying the shape of a pattern comprising:

an array of substantially identical memory units;

each unit comprising an electrical element, which is capable of being in a physical determinable "on" condition and an "off" condition, and a control cell, having a "ready" and "off" state, electrically connected thereto;

a source of electrical energy;

means for connecting said energy source to a first group of units and then to a different second group of units of said array;

said electrical elements and control cells being of such construction and being electrically connected in such a manner that when a control cell of a unit is in its "ready" state, the electrically connected electrical element in the same unit will be in its "on" condition if said unit is in the group connected to said electrical energy source;

said electrical elements and control cells being of such nature and so physically associated that the electrical element will so physically affect its connected control cell as to cause it to remain in its "ready" state as long as said element remains "on," so as to maintain said element in its "on" condition as long as said energy source is connected thereto;

the physical arrangement of said units in said first group relative to the units in said second group being such that a plurality of electrical elements in said first group will be adjacent each unit in said second group and be of such spacing therefrom that when more than one of said adjacent plurality of electrical elements are in their "on" condition, they will affect the control cell of the adjacent unit of said second group to the same extent as would its electrically connected element when "on;"

whereby the units of said first group will maintain a pattern originally impressed thereon by causing selected control cells in said first group to remain in their "ready" state as long as said electrical energy source is connected to the units in said first group and will cause those control cells in said second group which are adjacent a plurality of "on" electrical elements in said first group to be in their "ready" state;

so that a rapid transference of said electrical source to the units in said second group will cause the electrically connected electrical elements of said "ready" state control cells in said second group to be actuated to their "on" condition, so as to transfer said pattern to said second group as a modified pattern.

2. A device for modifying the shape of a light pattern comprising:

an array of composite units;

each unit comprising an electroluminescent element and a photo-sensitive cell electrically connected thereto;

a source of electrical energy;

means for connecting said source to each of a first group of units and then to a different second group of units of said array;

the electrical resistance of said phot-sensitive cells being of such value and varying in such manner with the intensity of light falling thereon that the light from its electrically connected electroluminescent element will cause the resistance of said cell to change sufficiently that the voltage applied to said connected electroluminescent element from said source will maintain said element in its illuminated condition;

the physical arrangement and spacing of said units in said first group relative to the units in said second group being such that a plurality of electroluminescent elements in said first group are adjacent to each unit in said second group and are of such spacing therefrom that when more than one of said adjacent plurality of electroluminescent elements are illuminated, they will supply substantially the same intensity of illumination to one cell of said second group as would its electrically connected element when illuminated;

whereby the units of said first group will maintain the original light pattern as long as said electrical energy source is connected to the units in said first group and will cause those photo-sensitive cells of said second group, which are near more than one illuminated adjacent electroluminescent element in said first group, to be in their changed resistance state;

so that a rapid transference of said electrical source to the units in said second group will cause the electrically associated electroluminescent elements of said changed resistance photo-sensitive cells to be actuated, so as to transfer said original light pattern to said second group as a modified pattern.

3. A device according to claim 2, in which:

the electroluminescent element and photo-sensitive cell in each unit are connected in series relation;

each of said photo-sensitive cells being of the photoconductive type, in which the electrical resistance thereof drops when illuminated;

and said source connecting means is so connected to said units as to cause said electrical energy source to be connected across the series arrangement of the electroluminescent element and photosensitive cell therein;

so that lowering of the resistance of the photo-sensitive cell will cause a greater part of the voltage of said source to be applied across said electroluminescent element, thereby energizing and maintaining energization thereof.

4. A device for reducing the size of a light pattern comprising:

an array of composite units;

each unit comprising an electroluminescent element and a photo-sensitive cell electrically connected thereto;

a source of electrical energy;

means for connecting said source to each of a first group of units and then a different second group of units of said array;

the electrical resistance of said photo-sensitive cells being of such value and varying in such manner with the intensity of light falling thereon that the light from its electrically connected electroluminescent element will cause the resistance of said cell to change sufficiently that the voltage applied to said connected electroluminescent element from said source is sufficient to maintain said element in its illuminated condition;

the physical arrangement of said units in said first group relative to the units in said second group being such that a plurality of electroluminescent elements in said first group surround each unit in said second group and are of such spacing therefrom that when said plurality are illuminated, they will supply substantially the same intensity of illumination to the surrounded cell of said second group as would its electrically associated element when illuminated;

whereby the units of said first group will maintain the original light pattern as long as said energy source is connected to the units in said first group and will cause those photo-sensitive cells of said second group units which are completely surrounded by illuminated electroluminescent elements of said first group units to be in their changed resistance state;

so that a rapid transference of said voltage source to the units in said second group will cause the electrically associated electroluminescent elements of said changed resistance photo-sensitive cells to be actuated, so as to transfer said light patern to said second group as a physically smaller pattern.

5. A device for reducing the size of a light pattern comprising:

an array of substantially identical units;

each unit comprising an electroluminescent element and a photo-sensitive cell electrically connected thereto;

a source of electrical voltage;

means for connecting said voltage source to each of a first group of said units and then to each of a different second group of units;

each of said electroluminescent elements being the same relatively small distance from the photosensitive cell in the same unit;

the intensity of illumination produced by said electroluminescent element, the change of resistance of said photo-sensitive cells, said small distance, the voltage of said source, and the energizing voltage of said electroluminescent element being so related that the radiation from said element will cause the resistance of the connected cell to change sufficiently to cause the voltage applied across said element to maintain energization of said element;

the physical arrangement and spacing of said units in said first and second groups being such that the same number of electroluminescent elements in said first group will be adjacent each unit in said second group and at a distance therefrom equal to the square root of said number times said relatively small distance;

whereby the units of said first group will maintain its illuminated pattern as long as said energy source is connected to the units in said first group, and rapid transference of said source to the units of said second group will cause energizing of those electroluminescent elements in said group which are electrically connected to photo-sensitive cells surrounded by said number of radiating elements in said first group;

thereby reducing the size of the pattern upon its transfer to the units of said second group.

6. A device for recording and modifying the shape of an optical image comprising:

an array of composite units;

each unit comprising an electroluminescent element and a photo-sensitive cell electrically connected thereto;

a source of electrical energy;

means for connecting said source to each of a first group of units and then to a different second group of units of said array;

the electrical resistance of said photo-sensitive cells being of such value and varying in such manner with the intensity of light falling thereon that a certain amount of light from an external object will cause the cell resistance to change sufficiently to energize said electrically connected electroluminescent element, and the light from said connected electroluminiscent element will maintain the resistance of said cell at a sufficiently changed value that the voltage applied to said connected electroluminescent element from said source will maintain said element in its illuminated condition;

the physical arrangement and spacing of said units in said first group relative to the units in said second group being such that a plurality of electroluminescent elements in said first group are adjacent to each unit in said second group and are of such spacing therefrom that when more than one of said adjacent plurality of electroluminescent elements are illuminated, they will supply substantially the same intensity of illumination to one cell of said second group as would its electrically connected element when illuminated;

whereby the units of said first group will maintain the pattern of an external radiation image thereon as long as said electrical energy source is connected to the units in said first group and will cause those photo-sensitive cells of said second group which are near more than one illuminated adjacent electroluminescent element in said first group to be in their changed resistance state;

so that a rapid transference of said electrical source to the units in said second group will cause the electrically associated electroluminescent elements of said changed resistance photo-sensitive cells to be actuated, so as to transfer said image pattern to said second group as a modified pattern.

7. A device for recording and then modifying the shape of a pattern comprising:

an array of substantially identical memory units;

each unit comprising an electrical element, which is capable of being in a physically determinable "on" condition and an "off" condition, and a control cell, having a "ready" and "off" state, electrically connected thereto;

a source of electrical energy;

means for connecting said energy source to each of the electrical elements and control cells of a first group of units and then the elements and cells of a different second group of units of said array;

said electrical elements and control cells being of such construction and being electrically connected in such manner that when a control cell of a unit is presented with a particular characteristic of an externally impressed pattern, it will change to its "ready" state and will cause the electrically connected electrical element in the same unit to reach its "on" condition if said unit is in the group connected to said electrical energy source;

said electrical elements and control cells being of such nature and so physically associated in each unit that the electrical element will so physically affect its connected cell as to cause it to remain in its "ready" state as long as said element remains "on", so as to maintain said element in its "on" condition as long as said energy source is connected thereto;

the physical arrangement of said units in said first group relative to the units in said second group being such that a plurality of electrical elements in said first group will be adjacent each unit in said second group and be of such spacing therefrom that when more than one of said adjacent plurality of electrical elements are in their "on" condition, they will effect the control cell of the adjacent unit in said second group to the same extent as would its electrically connected element when "on";

whereby the units of said first group will maintain a representation of said characteristic of the pattern thereon as long as said electrical energy source is connected across the units in said first group and will cause those control cells in said second group which are adjacent a plurality of "on" electrical elements in said first group to be in their "ready" state;

so that a rapid transference of said electrical source to the units in said second group will cause the electrically connected electrical elements of said "ready" state control cells to be actuated to their "on" condition, so as to transfer said pattern to said second group in a modified configuration.

8. A device for recording and reducing the size of an optical image comprising:

an array of substantially identical memory units;

each unit comprising an electrical element, which is capable of being in a physically determinable "on" condition and an "off" condition, and a control cell, having a "ready" and "off" state, electrically connected thereto;

a source of electrical energy;

means for connecting said energy source to each of the electrical elements and control cells of a first group of units and then the elements and cells of a different second group of units of said array;

said electrical elements and control cells being of such construction and being electrically connected in such manner that when a control cell of a unit is presented with a particular characteristic of an externally impressed pattern, it will change to its "ready" state and will cause the electrically connected electrical element in the same unit to reach its "on" condition if said unit is in the group connected to said electrical energy source;

said electrical elements and control cells being of such nature and so physically associated in each unit that the electrical element will so physically affect its connected cell as to cause it to remain in its "ready" state as long as said element remains "on," so as to maintain said element in its "on" condition as long as said energy source is connected thereto;

the physical arrangement of said units in said first group relative to the units in said second group being such that a plurality of electrical elements in said first group will surround each unit in said second group and be of such spacing therefrom that said adjacent plurality of electrical elements, when in their "on" condition, will affect the control cell of the surrounded unit of said second group to the same extent as would its electrically connected element when "on";

whereby the units of said first group will maintain a representation of said characteristic of the pattern thereon as long as said electrical energy source is connected across the units in said first group and will cause those control cells of said second group which are completely surrounded by "on" electrical elements in said first group to be in their "ready" state;

so that a rapid transference of said electrical source to the units in said second group will cause the electrically connected electrical elements of said "ready" state control cells to be actuated to their "on" condition, so as to transfer said pattern to said second group in a physically smaller configuration.

9. A device for sequentially modifying the shape of a pattern comprising:

an array of substantially identical memory units;

each unit comprising an electrical element, which is capable of being in a physical determinable "on" condition and an "off" condition, and a control cell, having a "ready" and "off" state, electrically connected thereto;

a source of electrical energy;

means for sequentially connecting said energy source to a first group of units, then to a different second group of units of said array, back to said first group, and so on;

said electrical elements and control cells being of such construction and being electrically connected in such a manner that when a control cell of a unit is in its "ready" state, the electrically connected electrical element in the same unit will be in its "on" condition of said unit if in the group connected to said electrical energy source;

said electrical elements and control cells being of such nature and so physically associated that the electrical element will so physically affect its connected control cell as to cause it to remain in its "ready" state as long as said element remains "on", so as to maintain said element in its "on" condition as long as said energy source is connected thereto;

the physical arrangement of said units in said first group relative to the units in said second group being such that a plurality of electrical elements in each of said groups are adjacent to one unit in the other group and are of such spacing therefrom that when more than one of said plurality of electrical elements are in their "on" condition, they physically affect the control cell of said adjacent unit of said other group to the same extent as does its electrically connected element when "on";

whereby the "on" electrical elements in said first group maintains the pattern originally impressed thereon by causing their connected control cells in said first group to remain in their "ready" state as long as said electrical energy source is connected to the units in said first group, and causes those control cells in said second group which are adjacent a plurality of "on" electrical elements in said first group to be in their "ready" state;

so that a rapid transference of said electrical source to the units in said second group will cause the electrically connected electrical elements of said "ready" state control cells in said second group to be actuated to their "on" condition, so as to transfer said pattern to said second group as a modified pattern;

the newly "on" electrical elements in said second group then maintaining said modified pattern by causing their connected control cells in said second group to remain in their "ready" state as long as said electrical energy source is connected to the units in said second group, and causing those control cells in said first group which are adjacent a plurality of newly "on" electrical elements in said second group to be in their "ready" state;

so that rapid transference of said electrical source back to the units of said first group will cause the electrical elements electrically connected to said "ready" state control cells in said first group to be actuated to their "on" condition, so as to transfer said modified pattern back to said first group as a further modified pattern;

subsequent sequential switching of said electrical en- energy source from one group to the other by said sequential connecting means causing transfer of said pattern back and forth between said groups with a modification of said pattern occurring upon each such transfer.

10. A device for sequentially modifying the shape of a pattern comprising:

an array of composite units;

each unit comprising an electroluminescent element and a photo-sensitive cell electrically connected thereto;

a source of electrical energy;

means for sequentially connecting said source to each of a first group of units, then to a different second group of units of said array, back to said first group, and so on;

the electrical resistance of said photo-sensitive cells being of such value and varying in such manner with the intensity of light falling thereon that the light from its electrically connected electroluminescent element causes the resistance of said cell to change sufficiently that the voltage applied to said connected electroluminescent element from said source maintains said element in its illuminated condition;

the physical arrangement and spacing of said units in said first group relative to the units in said second group being such that a plurality of electroluminescent elements in each of said groups are adjacent to one unit in the other group and are of such spacing therefrom that when more than one of said plurality of electroluminescent elements are illuminated, they will supply substantially the same intensity of illumination to the cell of said adjacent unit of said other group as would its electrically connected element when illuminated;

whereby the units in said first group maintains the original light pattern as long as said electrical energy source is connected to the units in said first group and causes those photo-sensitive cells of said second group, which are near more than one illuminated adjacent electroluminescent element in said first group, to be in their changed resistance state;

so that a rapid transference of said electrical source to the units in said second group will cause the electrically associated electroluminescent elements of said changed resistance photo-sensitive cells in said second group to be actuated, so as to transfer said original light pattern to said second group as a modified pattern;

the newly illuminated electroluminescent elements in said second group then maintaining said modified pattern by causing their connected photo-sensitive cells in said second group to remain in their changed resistance state as long as said electrical energy source is connected to the units in said group, and causing those photo-sensitive cells in said first group which are adjacent a plurality of newly illuminated electrical elements in said second group to be in their changed resistance state;

so that rapid transference of said electrical source back to the units of said first group will cause the electroluminescent elements electrically connected to said changed resistance photo-sensitive cells in said first group to be illuminated, so as to transfer said modified pattern back to said first group as a further modified pattern;

subsequent sequential switching of said electrical energy source from one group to the other by said sequential connecting means causing transfer of said pattern back and forth between said groups with a modification of said pattern occurring upon each such transfer.

11. A device for sequentially reducing the size of individual bright parts of a pattern field comprising:

an array of composite units;

each unit comprising an electroluminescent element and a photo-sensitive cell electrically connected thereto;

a source of electrical energy;

means for connecting said source to each of a first group of units, then to a different second group of units of said array, back to said first group, and so on;

the electrical resistance of said photo-sensitive cells being of such value and varying in such manner with the intensity of light falling thereon that the light from its electrically connected electroluminescent element causes the resistance of said cell to change sufficiently that the voltage applied to said connected electroluminescent element from said source will maintain said element in its illuminated condition;

the physical arrangement and spacing of said units in said first group relative to the units in said second group being such that a plurality of electroluminescent elements in each of said groups surround one unit in said second group and are of such spacing therefrom that when more than one of said surrounding plurality of electroluminescent elements are illuminated, they will supply substantially the same intensity of illumination to the cell of said surrounded unit of said other group as would its electrically connected element when illuminated;

whereby the units in said first group maintains the original light pattern as long as said electrical energy source is connected to the units in said first group and causes those photo-sensitive cells of said second group, which are surrounded by more than one illuminated electroluminescent element in said first group, to be in their changed resistance state;

so that a rapid transference of said electrical source to the units in said second group will cause the electrically associated electroluminescent elements of said changed resistance photo-sensitive cells in said second group to be actuated, so as to transfer said original bright parts of said pattern to said second group as reduced size parts;

the newly illuminated electroluminescent elements in said second group then maintaining said reduced size bright parts by causing their connected photo-sensitive cells in said second group to remain in their changed resistance state as long as said electrical energy source is connected to the units in said group, and causing those photo-sensitive cells in said first group which are surrounded by more than one newly illuminated electrical element in said second group to be in their changed resistance state;

so that rapid transference of said electrical source back to the units of said first group will cause the electroluminescent elements electrically connected to said changed resistance photo-sensitive cells in said first group to be illuminated, so as to transfer said reduced bright parts back to said first group as further reduced parts;

subsequent sequentially switching of said electrical energy source from one group to the other by said sequential connecting means causing transfer of said bright parts back and forth between said groups with a size reduction of said parts occurring upon each such transfer.

12. A device for sequentially reducing the size of individual bright parts of a pattern field and counting said parts before their size has been reduced to zero comprising:

an array of composite units;

each unit comprising an electroluminescent element and a photo-sensitive cell electrically connected thereto;

a source of electrical energy;

means for sequentially connecting said source to each of a first group of units, then a different second group of units of said array, back to said first group, and so on;

the electrical resistance of said photo-sensitive cells being of such value and varying in such manner with the intensity of light falling thereon that the light from its electrically connected electroluminescent element will cause the resistance of said cell to change sufficiently that the voltage applied to said connected electroluminescent element from said source is sufficient to maintain said element in its illuminated condition;

the physical arrangement of said units in said groups relative to the units in both its own and the other group being such that a plurality of electroluminescent elements in said each of said groups surround one unit in the other group and are of such spacing therefrom that when more than one of said plurality are illuminated, they will supply substantially the same intensity of illumination to the surrounded cell of said other group as would its electrically associated element when illuminated;

whereby the units of that group initially connected to said electrical energy source maintains the original pattern as long as said energy source is connected to the units in said group and causes those photo-sensitive cells of the other group units which are surrounded by more than one illuminated electroluminescent element of said energized group units to be in their changed resistance state;

so that a rapid transference of said voltage source to the units in said other group will cause the electroluminescent elements electrically connected to said changed resistance photo-sensitive cells to be actuated, so as to transfer said bright parts to said other group as physically smaller bright parts;

rapid return of said voltage source to said initially connected group will cause transference of said bright parts back to those units thereof that were just previously surrounded by more than one illuminated electroluminescent element in said other group so as to reduce further the size of said parts;

so that sequential transference back and forth of said electrical energy source from one group to the other thereby sequentially reducing the size of said bright parts;

means for counting the quantity of said parts which become reduced to a certain size;

and means for indicating said quantity.

13. A device according to claim 12, in which:

said counting means and indicating means include sizing means for determining and recording an indication of the number of times said source has been transferred between groups before each of said counted parts reaches said certain size.

14. A device according to claim 12, in which:

said counting means includes means for scanning at least one group of the electroluminescent elements in said array with a detector means between each transference of said source between said groups.

15. A device according to claim 14, in which:

said indicating means includes size recording means for giving an indication of the number of times said source has been transferred before each of said counted parts reaches said certain size.

References Cited by the Examiner

UNITED STATES PATENTS

| | | | |
|---|---|---|---|
| 2,958,464 | 11/1960 | Nassenstein | 235—92 |
| 3,104,372 | 9/1963 | Rabinow et al. | 340—146.3 |
| 3,196,398 | 7/1965 | Baskin | 340—146.3 |

OTHER REFERENCES

"A Quasi-Topological Method for the Recognition of Line Patterns," by Sherman, from "Information Processing," Proc. of the International Conference on Information Processing, UNESCO, Paris, June 15–20, 1959, pp. 232–238.

MAYNARD R. WILBUR, *Primary Examiner.*

J. E. MILLER, *Assistant Examiner.*